United States Patent [19]

Robson

[11] 3,968,890

[45] July 13, 1976

[54] VEHICLE LOAD LIFTING AND LOWERING UNITS

[75] Inventor: Robert Robson, Welwyn Garden City, England

[73] Assignee: John Ratcliff (Tail Lifts) Limited, England

[22] Filed: Apr. 8, 1975

[21] Appl. No.: 566,113

[30] Foreign Application Priority Data

Apr. 11, 1974 United Kingdom............... 16393/74

[52] U.S. Cl............................. 214/75 T; 214/77 P; 214/DIG. 10
[51] Int. Cl.² ........................................... B60P 1/44
[58] Field of Search ............. 214/75 R, 75 T, 77 R, 214/77 P, DIG. 10

[56] References Cited
UNITED STATES PATENTS

| | | | |
|---|---|---|---|
| 3,233,758 | 2/1966 | Darfs................................ | 214/75 T |
| 3,416,677 | 12/1968 | Abfalter........................... | 214/75 T |
| 3,598,264 | 8/1971 | Massie........................ | 214/DIG. 10 |

FOREIGN PATENTS OR APPLICATIONS

| | | | |
|---|---|---|---|
| 1,220,757 | 1/1971 | United Kingdom.......... | 214/DIG. 10 |

*Primary Examiner*—Frank E. Werner
*Assistant Examiner*—Lawrence J. Oresky
*Attorney, Agent, or Firm*—Young & Thompson

[57] ABSTRACT

There are disclosed two forms of load lifting and lowering unit for attachment to a vehicle. The units are of the kind in which a load platform is carried between two parallel spaced-apart articulated parallelogram linkages, movable in unison up and down guide members spaced across an access opening of the vehicle to raise and lower a load to and from the access opening. An inextensible tie member, pivotally connected between the platform and a swinging arm of the parallelogram linkage, causes the platform automatically to close off the access opening when the linkages are folded towards the vehicle. In one embodiment, the swinging arm cooperates with a fixed stop during upward movement of the linkages to effect such closure: in the other embodiment, a fluid operated ram swings the platform upwardly about its pivot to fold the linkages towards the vehicle and cause the platform to close off the access opening.

8 Claims, 5 Drawing Figures

VEHICLE LOAD LIFTING AND LOWERING UNITS

1. Field of the Invention

The invention relates to vehicle load lifting and lowering units.

2. DESCRIPTION OF THE PRIOR ART

British patent specification No. 1,220,757 describes and illustrates a vehicle load lifting and lowering unit, comprising a pair of parallel spaced-apart guides, mountable in a vehicle so as to stand substantially upright across an access opening of the vehicle and slidably supporting a pair of articulated parallelogram linkages, associated one with each guide and with a load lifting and lowering platform pivotally carried between them, the platform together with the articulated linkages being movable up and down the guides by a prime mover connected to one or both of the articulated linkages and the unit further comprising means to actuate the articulated linkages, during movement thereof in one direction along a predetermined length of said guides, to alter the configuration of the linkages and thereby move the platform towards the interior of the vehicle for storage purposes, and to actuate the articulated linkages in the opposite sense, during reverse movement of the linkages along said predetermined length, thereby to move the platform away from said interior towards an operative position.

Such a unit will be referred to from now on as a unit of the kind outlined above.

SUMMARY OF THE INVENTION

The present invention is a modification of the invention of British patent specification No. 1,220,757, and accordingly provides a vehicle load lifting and lowering unit, of the kind outlined above, in which an inextensible tie member is pivotally connected between the platform and the upper or lower swinging link of one of the parallelogram linkages at points which lie on the same side of the platform pivot, so that, when the linkage is actuated to move the platform towards the interior of the vehicle, the platform is swung about its pivot to fold with the linkage towards the vehicle interior, and when the linkage is actuated in the opposite sense the platform is swung in the opposite direction about its pivot to unfold with the linkage into its operative position.

Said means to actuate the linkage may comprise an arm, connected to or forming part of the upper or lower swinging link of the parallelogram linkage and cooperating with a stop, fixed relative to the linkage on the opposite side of the guide to the platform-supporting arm of the linkage such that, on movement of the linkage in said one direction along the guide, said stop engages said arm to articulate the linkage and swing the platform about its pivot towards the vehicle interior.

Alternatively said means may comprise a fluid operated ram, connected between the platform, or an extension thereof, and one of the arms of the linkage, operation of the ram thereby causing the platform to be swung about its pivot towards the vehicle interior when the linkage is actuated in said one direction.

Preferably the ram is connected between the platform or an extension thereof, and the platform-supporting arm of the linkage.

There may be provided means to prevent further operation of said prime mover after said predetermined length of movement of the linkages along the guide has occurred.

In the case where the linkage actuating means comprises a fluid operated ram, the said means to prevent further operation of the prime mover may also initiate operation of said ram after further operation of the prime mover has been prevented.

Said means may for example comprise electrically operated limit switches and cooperating fluid control valves.

In any of the above arrangements, there may be provided means to assist said linkage actuating means in swinging the platform about its pivot and folding it and the linkages towards the vehicle interior.

Said means may comprise a torsion bar in one or more of the linkage pivots.

Preferably a torsion bar is provided in the platform pivot and is fixed at one end to the platform and at the other end to the platform-supporting arm and is unstressed torsionally when the platform is in its inoperative position.

There are preferably provided catch means to retain the platform and linkages in the inoperative position.

The or each catch means may comprise two cooperating parts, one formed on the guide and one formed on the platform or an arm of the linkage, so that the two parts can be brought into cooperating engagement when the platform has been swung into its inoperative position.

Said parts may for example comprise a hook formed on the guide and a cooperating projection formed on an external part of the linkage and moving therewith, the projection initially coming to rest above the hook when the platform is swung into its inoperative position and then being lowered into engagement with the hook by operation of said prime mover.

DESCRIPTION OF THE PREFERRED EMBODIMENTS

Figure 1:
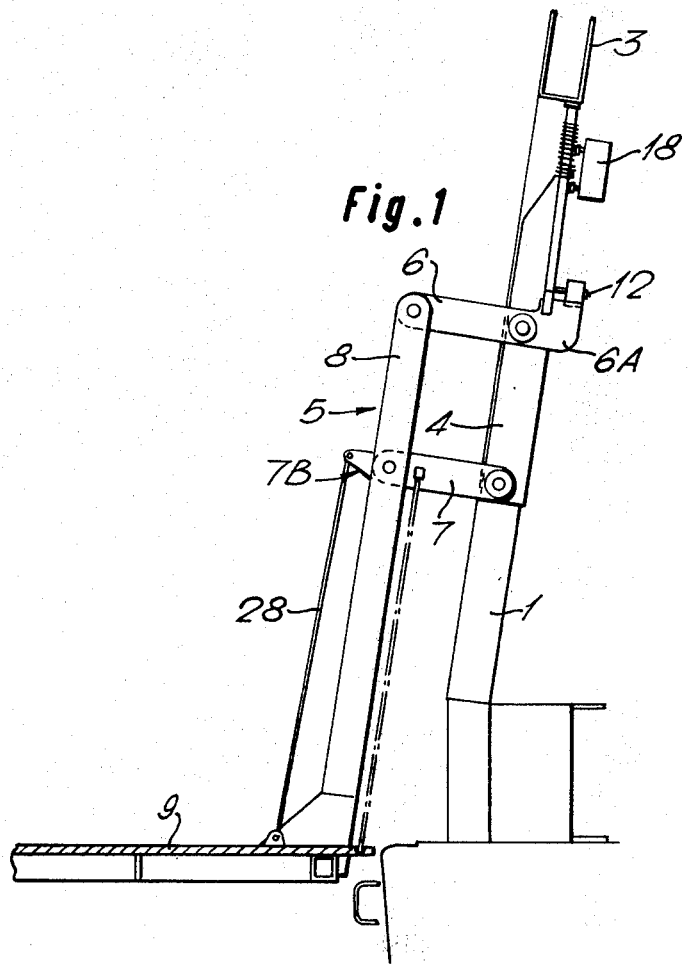
FIG. 1 shows in side elevation a vehicle load lifting and load lowering unit embodying the invention.

The vehicle load lifting and lowering unit shown in FIG. 1 is a modification of the unit shown in the drawings of British patent specification No. 1,220,757, and corresponding parts of this unit are given the same reference numerals as in that specification. The unit comprises two substantially upright guides 1, spaced apart transversely of a vehicle access opening and parallel to one another to extend in a generally up and down direction. Movable up and down each guide is an articulated parallelogram linkage indicated generally at 5 and comprising a runner 4, an upper swinging link 6, a lower swinging link 7, and a platform-supporting drop arm 8 to the lower end of which a platform 9 is pivotally connected. The arms of each linkage are all pivotally interconnected and each runner can be moved up and down its guide by a prime mover comprising a fluid-operated ram and cable system (not shown in the Figure) of known kind.

Pivotally connected between the platform 9 and an extension 7b of each lower swinging link 7 is an inextensible tie member 28. It will readily be appreciated that articulation of the linkages 5 in a clockwise direction will cause the drop arms 8 to fold flat against the guides 1 and that the presence of the tie members 28 will also cause the platform 9 to be swung upwardly about its pivot towards an inoperative position in which it in turn lies flat against the drop arms 8. It will also be appreciated that the same effect could be achieved if each tie member 28 were connected at one end to an extension of the platform 9 and at the other end to the lower link 7, as shown in broken line in the Figure.

An arm 6a forms an extension of the upper link 6 of each linkage 5 and, after a predetermined amount of movement of its runner 4 up the guide 1, contacts a stop 18 fixed to the guide. Continued upward movement of the runner 4 will cause the arm 6a to be swung clockwise about its pivot and will automatically articulate the linkage 5 to bring the linkage and platform toward the inoperative position. Thus closure of the linkage and platform will occur automatically if the (not shown) fluid operated lifting ram continues to move the runners 4 up the guides 1.

Alternatively a limit switch 12 mounted on the arm 6a contacts the stop 18 and prevents further operation of the lifting ram, the platform 9 then being grasped and swung manually towards its inoperative position and the linkages 5 being closed automatically with it.

Figure 2:
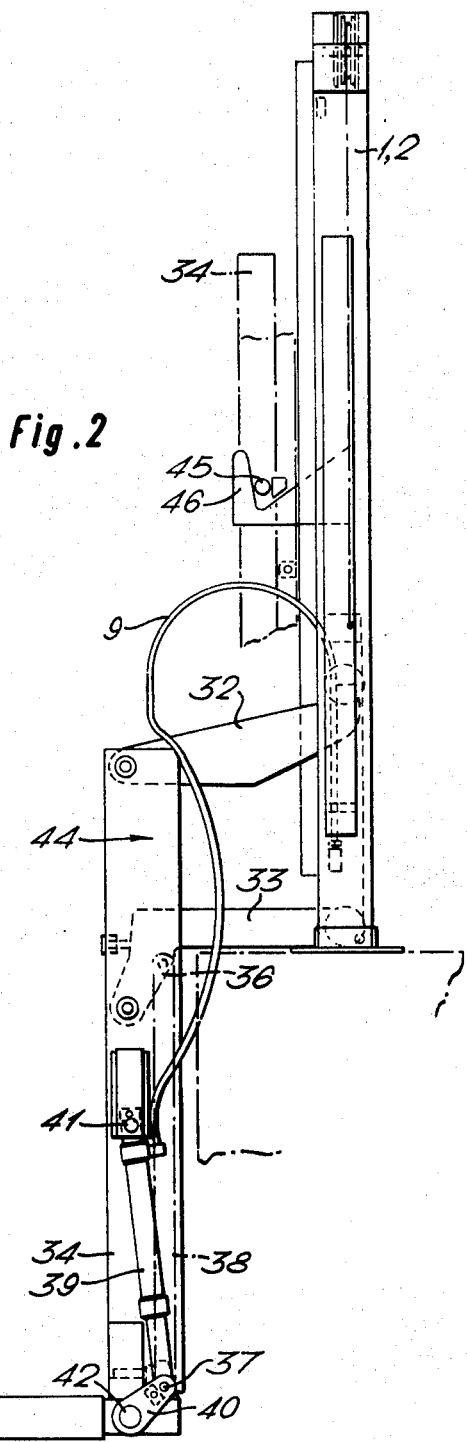
FIG. 2 shows a further vehicle load lifting and load lowering unit embodying the invention, in side elevation.
Figure 3:
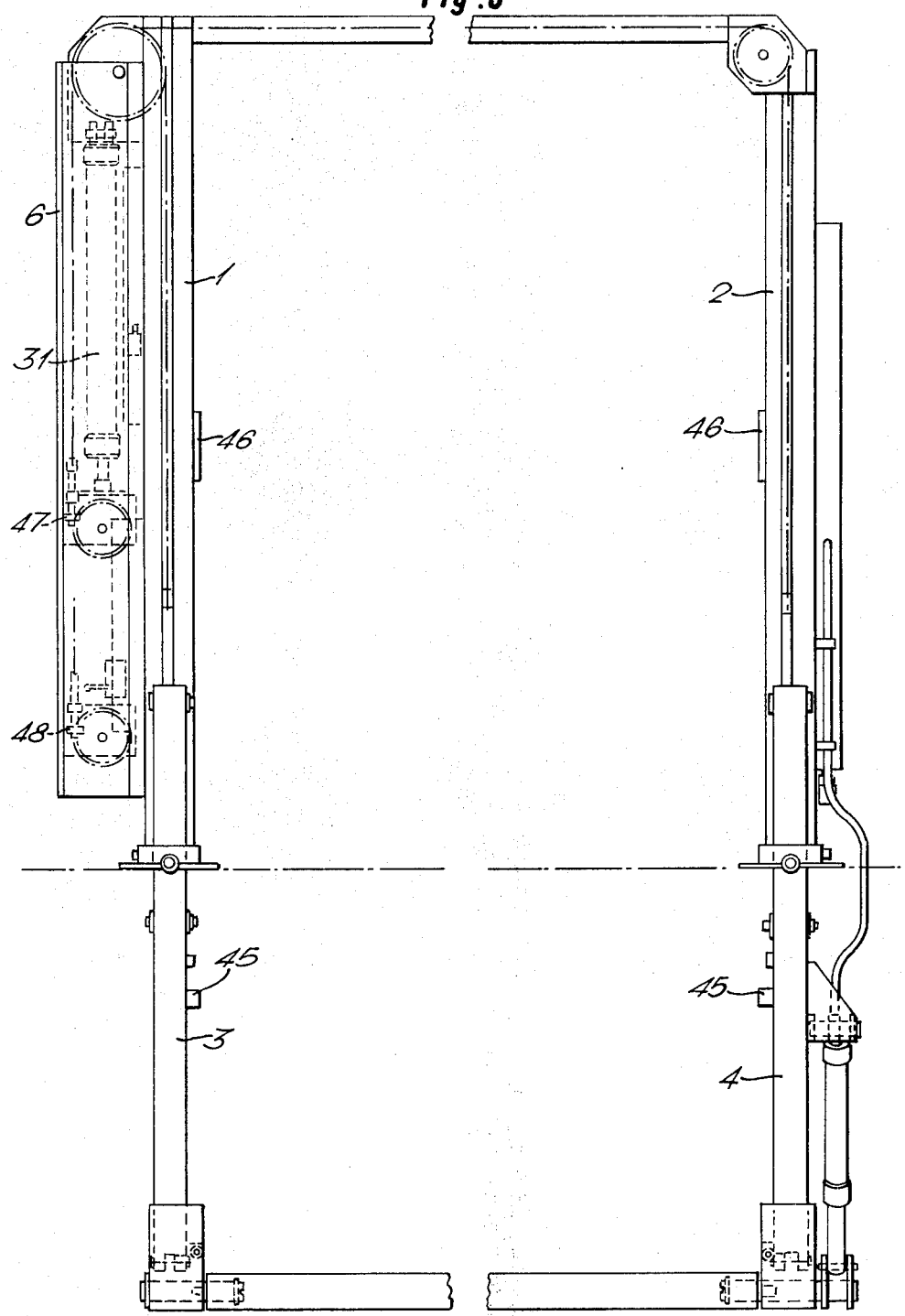
FIG. 3 shows the unit of FIG. 2 in end elevation.
Figure 4:
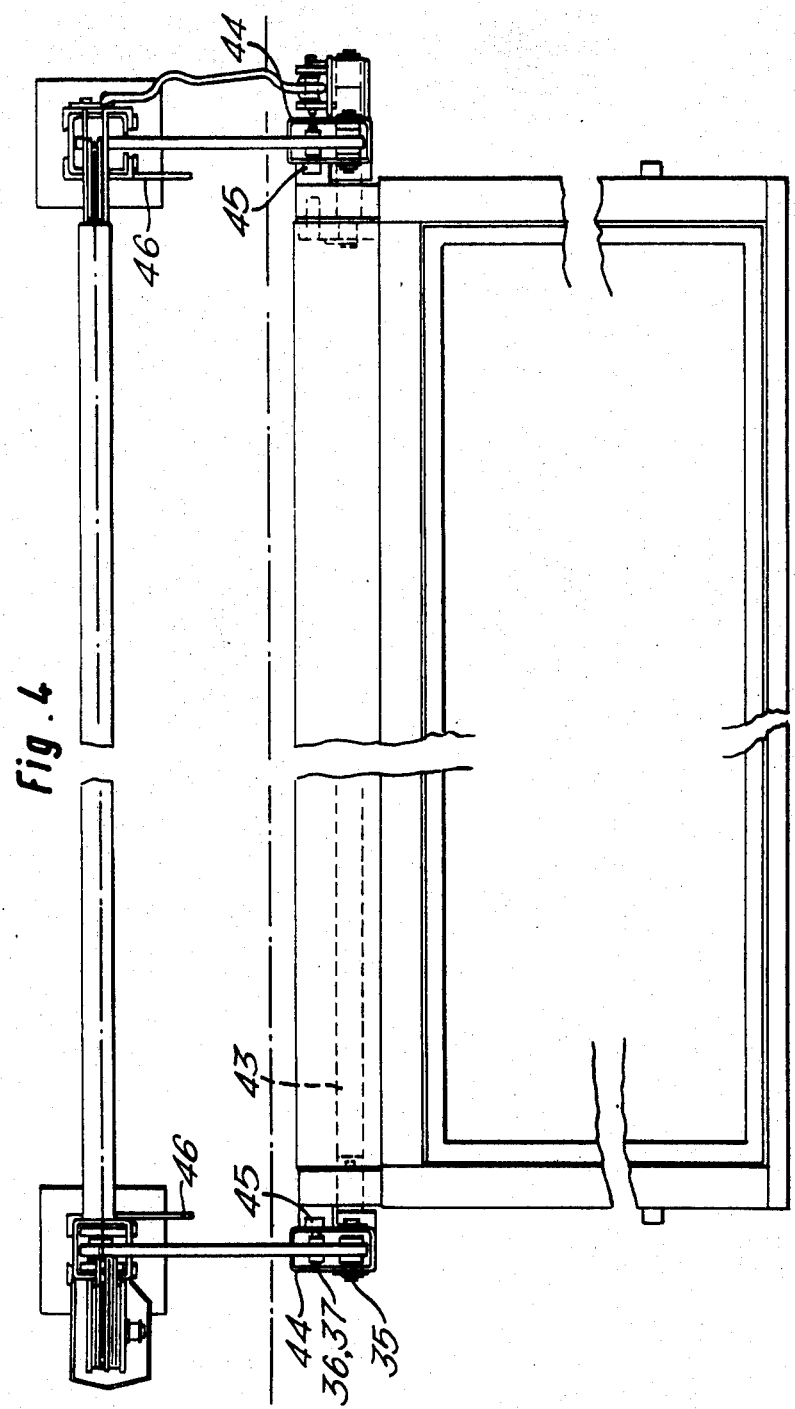
FIG. 4 shows the unit of FIGS. 2 and 3 in plan.
Figure 5:
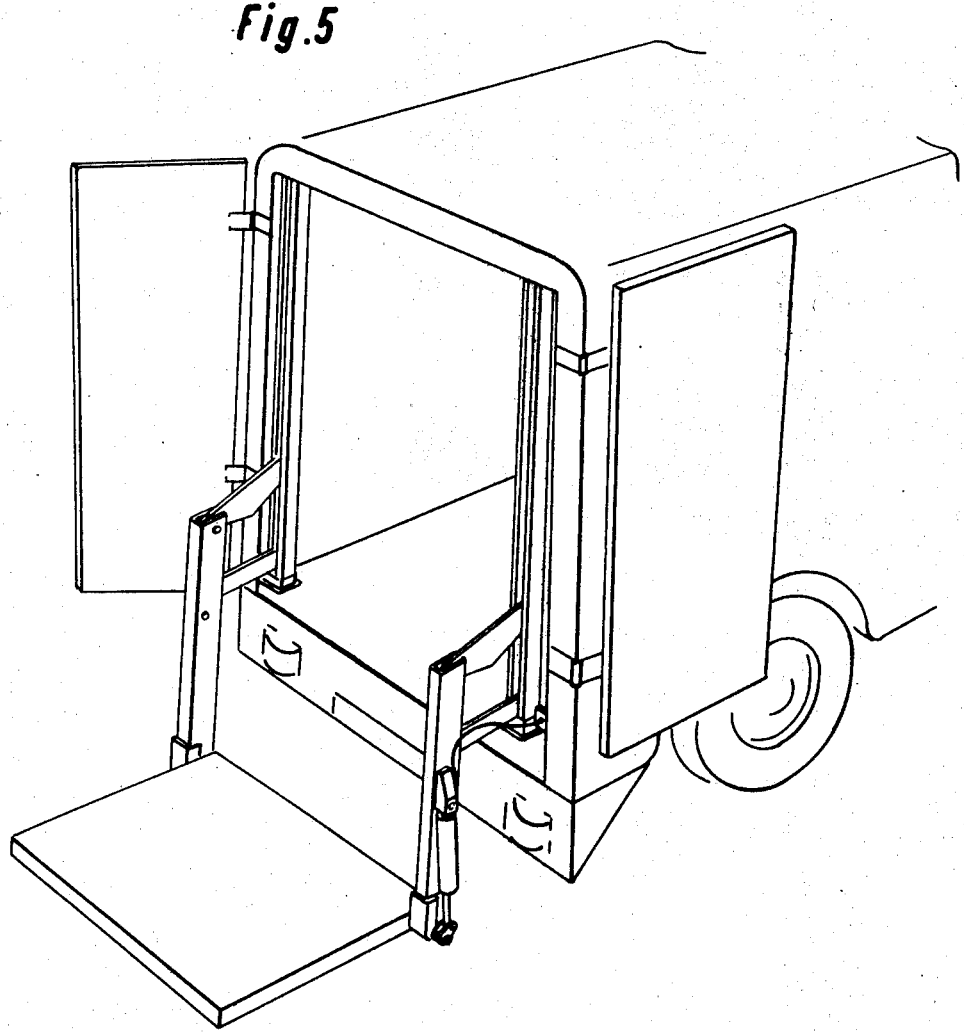
FIG. 5 shows the unit fitted to a light van.

FIGS. 2, 3 and 4 show an embodiment of the invention in which the runners are again moved up and down the guide by a main fluid operated ram, but the linkages are closed by a separate, secondary ram. In this embodiment, parallel upright spaced apart guide columns 1, 2 have runners 3, 4 respectively mounted on them for sliding up and down movement under the action of a fluid operated main lifting ram 31. The ram 31 is housed inside a ram cover 6 on one of the guide columns and extends and retracts inside this cover to operate a cable and pulley system which lifts and lowers the runners 3, 4. Such systems are known and will therefore not be described in any detail.

Each runner 3, 4 forms one arm of an articulated parallelogram linkage comprising an upper swinging link 32, a lower swinging link 33 and a drop arm 34. A platform 5 is pivotally connected between the lower ends of the drop arms 4 and inextensible tie members 38 (shown in broken line in FIG. 2) are each connected at 37 to an extension of the platform 5 and at 36 to one of the lower links 33. A fluid operated secondary ram 39 is connected at one end to the platform extension 40, adjacent one of the pivots 37, and at the other end via a pivot 41 to the adjacent drop arm 34. A supply line 9 conducts hydraulic fluid from a main reservoir (not shown) to this ram 39.

A torsion bar, coaxial with the platform pivots 42, spans part of the width of the platform as shown in broken line by the numeral 43 in FIG. 4. One end of this bar is welded to one of the platform pivots as can be seen in FIG. 4, and the other end is welded to the underside of the platform itself. The bar 43 biasses the platform 5 towards its inoperative position, and is torsionally unstressed when the platform is almost folded flat against the drop arms 34.

Each drop arm 34 is of box section and shrouds the tie member 38 of its linkage during movement of the linkage. To the top portion 44 of each drop arm is welded a projection 45. Complementary hooks 46 project from each of the guide columns 1, 2. The purpose of these projections and hooks will become apparent as the operation of the unit is now described.

In use, with the guide columns 1, 2 mounted across the access opening of a vehicle (the vehicle floor level being indicated in chain line in the Figures) and the platform open and level with the ground on which the vehicle stands, the main lifting ram 31 is first extended to move the runners 3, 4 up the guide columns 1, 2. The platform is thus brought to the level of the vehicle floor whilst remaining parallel with the ground on which the vehicle stands. Thus a load situated on the platform can be raised from ground level to the level of the vehicle floor and can then be manoeuvred into the vehicle from the platform whilst the platform is held at floor level. To close the lift, the main lifting ram 31 is again extended and the platform rises slightly until a striker 47, mounted on the downward-travelling end of the extending ram 31 inside the ram cover plate 6, contacts a limit switch 48 fixed to the inside of the cover plate. This may already have occurred if the platform was initially brought right up to floor level or may occur shortly before the platform reaches floor level. In either event, operation of the limit switch 48 by the striker 47 prevents further extension of the main lifting ram 31 and automatically brings into operation the secondary ram 39. The ram 39 extends, swinging the platform 5 upwardly about the pivots 37 and 42 and, by virtue of the presence of the tie members 38, articulating the linkages 32, 33, 34 to bring the drop arms 34 into a position parallel with the guide columns 1, 2 (when viewed in side elevation) and to bring the platform 5 automatically into a similar position.

When the platform reaches its final closed position, the projections 45 will be vertically above the hooks 46. The main lifting ram 31 is then retracted again, to lower the runners 3, 4 a short distance down the guide columns 1, 2 until the projections 45 are firmly engaged in the hooks 46. It will be appreciated that these hooks and projections thereby constitute a catch means which retain the platform and linkages in their closed positions and keep the vehicle access opening closed — for example, whilst the vehicle is travelling.

To open the platform, the sequence of operations set out above is reversed. The main lifting ram 31 is extended to raise the runners 3, 4 up the guide columns 1, 2 and bring the projections 45 out of engagement with the hooks 46. The ram 31 is then automatically stopped by the striker 47, and secondary ram 39 is depressurised to retract and allow the linkages to open under their own weight and the weight of the platform 5, with the platform opening at the same time until it is fully open and parallel with the ground on which the vehicle rests. The secondary ram 39 is then rendered inoperative and the main lift ram 31 is retracted to lower the platform to ground level to the position shown in FIG. 2.

It will be appreciated that, with the platform swung down into its fully open position, the torsion bar 43 will be torsionally stressed by the weight of the cantilevered platform. Thus, when the secondary ram 39 is again extended to close the linkages, the torsion bar will assist the ram in swinging the platform about its pivot 42 towards the final closed position.

I claim:

1. For attachment to a vehicle, a load lifting and lowering unit comprising:

a pair of parallel spaced-apart guides, mountable in a vehicle so as to stand substantially upright across an access opening of the vehicle, b. a pair of articulated parallelogram linkages, slidably supported one on each of said guides, c. a load lifting and lowering platform pivotally carried between said linkages, d. a prime mover connected to said articulated linkages to move the linkages up and down the guides, e. means to actuate the articulated linkages, during movement thereof in one direction along a predetermined length of said guides, to alter the configuration of the linkages and thereby move the platform towards the interior of the vehicle for storage purposes, and to actuate the articulated linkages in the opposite sense, during reverse movement of the linkages along said predetermined length, thereby to move the platform away from said interior towards an operative position, and f. an inextensible tie member, pivotally connected between said platform and a swinging link of said parallelogram linkage at points which lie on the same side of the platform pivot, so that, when the linkage is actuated to move the platform towards the interior of the vehicle, the platform is swung about its pivot to fold with the linkage towards the vehicle interior, and when the linkage is actuated in the opposite sense the platform is swung in the opposite direction about its pivot to unfold with the linkage into its operative position.

2. The unit of claim 1, in which said means to actuate the linkage comprises an extension of said swinging link of the parallelogram linkage and a cooperating stop, fixed relative to the linkage on the opposite side of the guide to the platform-supporting arm of the linkage so that, on movement of the linkage in said one direction along the guide, said stop engages said arm to articulate the linkage and swing the platform about its pivot towards the vehicle interior.

3. The unit of claim 1, in which said means to actuate the linkage comprises a fluid operated ram, connected between the platform and one of the arms of the linkage so that operation of the ram causes the platform to be swung about its pivot towards the vehicle interior when the linkage is actuated in the said one direction.

4. The unit of claim 3, in which the ram is connected between the platform and the platform-supporting arm of the linkage.

5. The unit of claim 4, further comprising control means which first prevent further operation of said prime mover after said predetermined length of movement of the linkages along the guides has occurred and then initiate operation of said ram to close the platform.

6. The unit of claim 5, further comprising a torsion bar in one of the linkage pivots which biasses the linkage towards its closed inoperative position.

7. The unit of claim 6, in which said torsion bar is provided in the platform pivot and is fixed at one end to the platform and at the other end to the platform-supporting arm.

8. The unit of claim 7, in which a hook is formed on the guide and a cooperating projection is formed on an external part of the linkage to move therewith, the projection initially coming to rest above the hook when the platform is swung into its inoperative position, and means then operating said prime mover to lower the projection into engagement with the hook to retain the platform and linkage in the inoperative position.

* * * * *